United States Patent [19]
Maiste et al.

[11] 3,841,536
[45] Oct. 15, 1974

[54] ROTARY FLOW CONTROL VALVE FOR A COMBINE GRAIN BIN

[75] Inventors: Arved Maiste; Melvin F. Robertson, both of Brantford, Ontario, Canada

[73] Assignee: White Motor Corporation of Canada Limited, Brantford, Ontario, Canada

[22] Filed: Apr. 19, 1972

[21] Appl. No.: 245,377

[52] U.S. Cl.................. 222/503, 222/506, 222/485
[51] Int. Cl............................................. B65d 47/00
[58] Field of Search ........... 222/176, 177, 178, 506, 222/502, 503, 557, 556, 413, 482, 485, 129

[56] References Cited
UNITED STATES PATENTS

| | | | |
|---|---|---|---|
| 2,126,949 | 8/1938 | Ditchfield | 222/485 |
| 2,776,078 | 1/1957 | Raynor | 222/502 |
| 3,040,939 | 6/1962 | McCollough | 222/503 |
| 3,122,106 | 2/1964 | Novelli | 222/503 |
| 3,343,725 | 9/1967 | Cammon | 222/502 |

Primary Examiner—Robert B. Reeves
Assistant Examiner—H. Grant Skaggs, Jr.
Attorney, Agent, or Firm—Lockwood, Dewey, Zickert & Alex

[57] ABSTRACT

A rotary valve structure for controlling the flow of grain through elongated openings extending along opposite side edges of an auger shield and into a horizontal grain discharge auger housing or boot having upwardly sloping panels of the bin bottom extending from the top edges of the auger housing. An auger shield, preferably in the form of an elongated inverted V-member is mounted over the auger housing and auger therein with the opposing side edges of the shield spaced being above the opposing upper edges of the auger housing so as to provide grain inlet openings therebetween along opposite sides of the shield. A rotary valve member is mounted under the auger shield and includes two elongated strip members which are sufficiently wide to close off or barricade the elongated grain inlet openings when the valve member is rotated to the closed position. The valve member is rotatable to a fully open position in which the strip members are completely removed from the elongated openings and has intermediate positions for partially closing or partially opening the grain inlet openings.

1 Claim, 3 Drawing Figures

ROTARY FLOW CONTROL VALVE FOR A COMBINE GRAIN BIN

This invention relates generally to innovations and improvements in a rotary valve for a generally horizontal grain discharge auger housing in the bottom of a combine grain tank with the auger housing having an auger shield supported over the housing with the bottom edges of the shield being spaced above the top edges of the auger housing so as to provide elongated grain inlet openings therebetween through which grain flows from the bin into the housing.

More specifically, the invention relates to a rotary valve for completely or partially closing off the opposing elongated grain inlet openings extending along opposite sides of a grain discharge auger housing, the control valve being located underneath the auger shield. The control valve has two strip members which extend along opposite sides of the valve and in their closed position shut-off or barricade the elongated grain inlet openings. The control valve may be readily rotated or turned from the closed to the fully open position or to an intermediate position in which the strip members partially close off the grain inlet openings.

The object of the invention, generally stated is the provision of a rotary flow control valve of the class described which is of relatively simple, rugged and economical construction, is easy to operate and is characterized in having two grain inlet opening closing members which are in the form of elongated strips or plates which assume an approximately vertical or upright position when in the closed position so that a minimum force is required to rotate the valve member either from the fully closed position or into the fully closed position, since in either case the plate members are approximately on edge and therefore support and operate against only a minimum weight of superposed grain.

Certain other and more specific objects of the invention will, in part, be obvious and will, in part, appear hereinafter.

For a more complete understanding of the nature and scope of the invention reference may now be had to the following detailed description thereof taken in connection with the accompanying drawings wherein.

Figure 1:
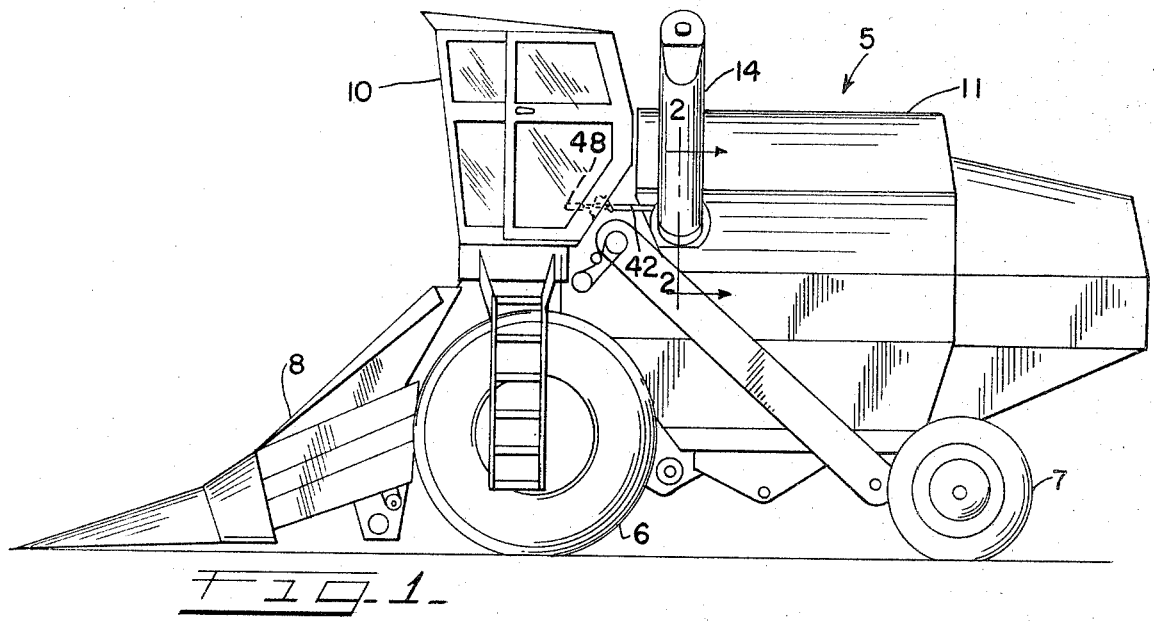
FIG. 1 is a side elevational view of a self-propelled combine the grain tank of which has a transverse discharge auger housing provided with a rotary valve structure in accordance with the present invention.

In FIG. 1 a self-propelled combine of known type is indicated generally at 5 which includes a pair of main drive wheels 6—6, a pair of trailing support and steering wheels 7—7, a crop header 8, an operator's cab 10 and a grain tank 11. The forward portion of the grain tank 11 has a transverse housing 12 for a grain discharge auger 13. At its discharge end the auger housing 12 opens into the lower end of an upwardly inclined grain discharge spout 14 which is provided with an elevating auger of known type.

Figure 2:
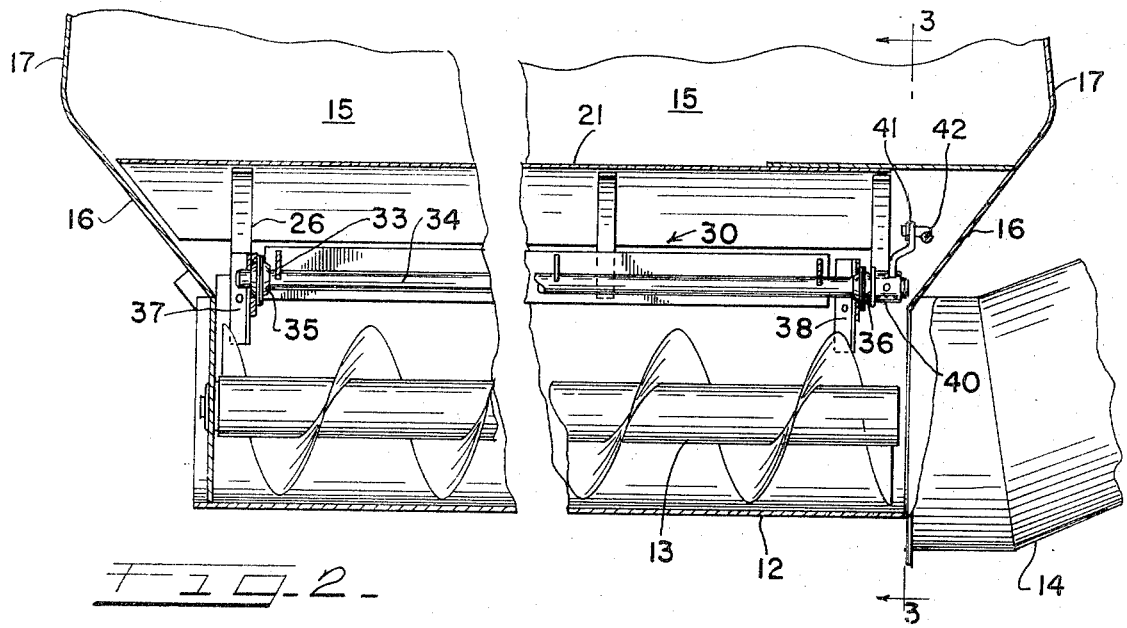
FIG. 2 is an enlarged fragmentary vertical sectional view taken on line 2—2 of FIG. 1 through the grain discharge auger housing with the rotary control valve therefor being shown in its closed position.
Figure 3:
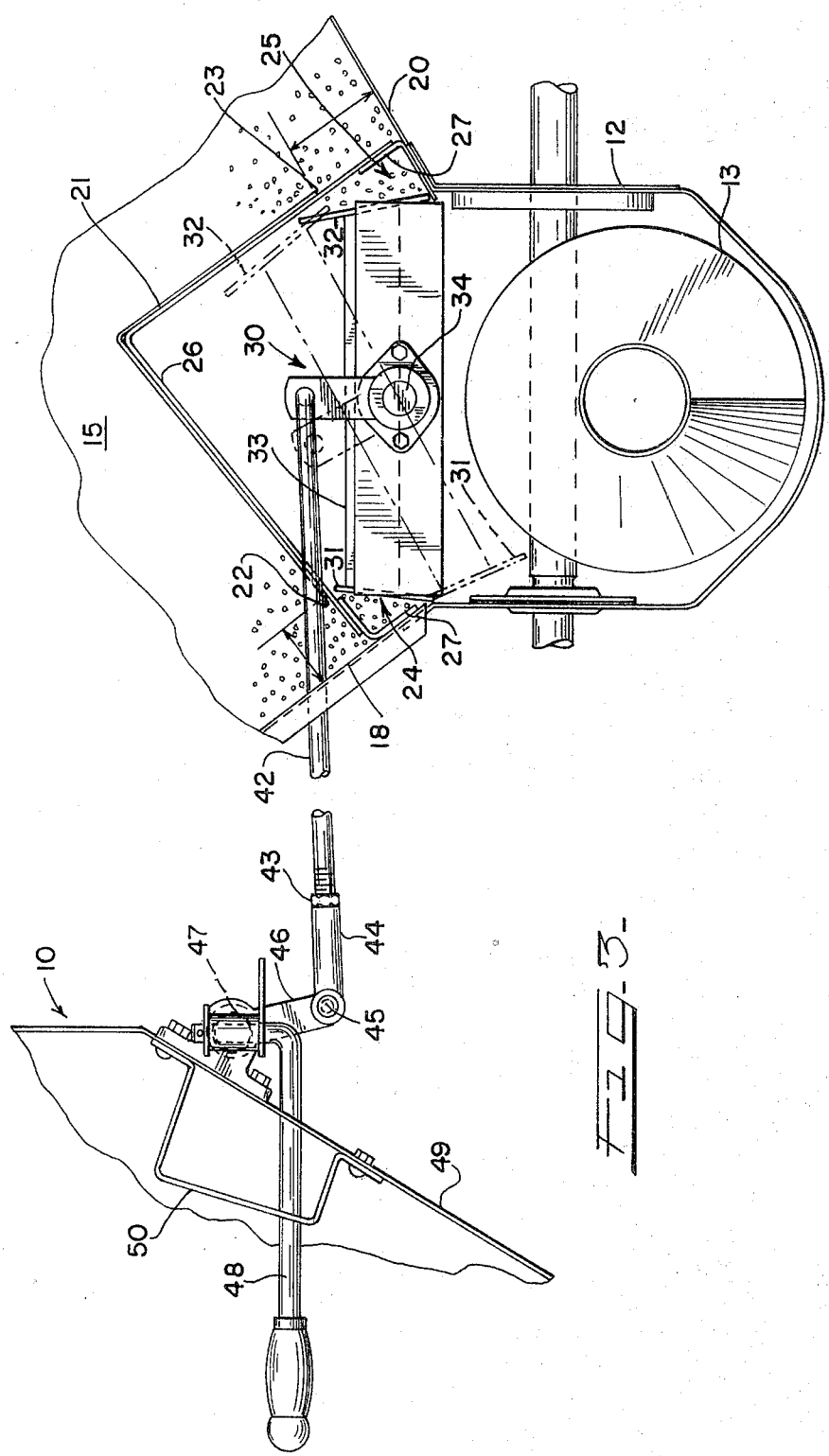
FIG. 3 is a view on a further enlarged scale taken on line 3—3 of FIG. 2 having added thereto a showing in side elevation of the manual operating mechanism for the rotary valve including the operator's handle that is located in the cab of the combine.

The transverse hopper portion of the grain tank 11 is indicated generally at 15 in FIGS. 2 and 3. This hopper portion has outwardly sloping sides 16—16 extending in a front-to-rear direction which merge into generally upright side portions 17—17. In the transverse direction the hopper 15 is provided with an upwardly inclined front panel 18 (FIG. 3) and an upwardly inclined rear panel 20. The lower edges of the front panel 18 and the rear panel 20 are connected to the upper front and rear edges, respectively, of the auger housing 12.

In order to shield the auger 13 from grain contained in the hopper 15, an inverted-V auger shield 21 is provided which extends transversely across the hopper 15 between the inclined sides 16—16 (FIG. 2). The lower front edge of the auger shield is indicated at 22 (FIG. 3) while the rear edge thereof is indicated at 23. Both of these edges are spaced substantially directly above the corresponding upper edges of the auger housing 12 so as to provide elongated front and rear grain inlet openings 24 and 25, respectively.

The auger shield 21 is supported by means of a plurality of spaced V-strap members 26—26 the lower ends of which project beyond the lower edges 22 and 23 of the shield 21 so as to attach (e.g. by welding) to the upper projecting legs of a corresponding plurality of angle members 27—27. The lower legs of the angle members 27—27 are secured to the panels 18 and 20 as shown in FIG. 3.

The foregoing structure and components of the combine grain tank 11 may be considered known and conventional. The present invention resides in the rotary valve structure for closing the elongated grain openings 24 and 25. This valve structure is indicated generally at 30 in FIGS. 2 and 3. The valve structure 30 includes a pair of front and rear strip members or elongated plates 31 and 32, respectively, which have a width sufficient to close or barricade the corresponding inlet openings 24 and 25 respectively. The strip members 31 and 32 are carried on a suitable frame structure which comprises a plurality of front-to-rear extending support strips 33—33 whcih are spaced along and mounted on the upper portion of a support shaft 34 which itself extends parallel to, and is spaced directly above, the discharge auger 13. The shaft 34 is suitably journaled at opposite ends in bearings 35 and 36 which in turn are suitably mounted on supporting brackets 37 and 38.

At its right end (as viewed in FIG. 2) the shaft 34 is provided with a collar 40 which is secured on the shaft by a set screw or other means. The collar 40 carries an upstanding dog leg crank arm 41 the upper end of which is apertured to receive the bent rear end of an actuating rod 42. The actuating rod 42 extends forwardly, as shown in FIG. 3, to the rear of the combine cab 10 where it is screwed into a nut 43 carried on a link 44 which is pivoted on the pin 45 carried on the lower end of an arm 46. The arm 46 is rigidly mounted on a shaft 47 which is actuated by a handle 48 which extends through to the rear wall 49 of the operator's cab 10 so as to be accessible to the operator on the interior. The handle 28 also extends through a bracket 50 mounted on the inside of the wall 49 which is provided with a plurality of vertically aligned notches (not shown) so that the handle can be secured in its uppermost and lowermost positions and at least one intermediate position. The rotary valve 30 is closed when the handle 48 is in its lowermost position and fully open when it is in its uppermost position.

Referring to FIG. 3, the valve 30 is shown in full line in its closed position and in broken line in its fully open position. It will be seen that in the closed position the strip or plate members 31 and 32 substantially close or barricade the elongated vertical grain openings 24 and 25, respectively. When the strip members 31 and 32 are barricading or closing the openings 24 and 25, respectively, they are in generally an upright position although toed in slightly at the top. This approximately upright position is an important feature since it allows the valve 30 to be operated with a minimum force even when the tank 11 is filled with grain. The reason is that while the weight of the grain presses in horizontally on the strip members 31 and 32 the weight of the grain does not rest on these members. Accordingly, the valve member 30 can be rotated without having to encounter and overcome the weight of the grain burden to an appreciable extent.

In operation, when the combine 5 comes into the field in the empty condition, the operator will set the handle 48 so that the rotary valve 30 is closed with the valve members or strips 31 and 32 barricading the elongated openings 24 and 25. As the grain tank 11 fills, none of the grain runs into the auger housing or trough 12 except possibly for a slight amount of leakage which is or no consequence. Accordingly, there is no leakage of grain through the discharge tube even when it is pointed down hill as the combine traverses a side hill.

When it comes time to empty the grain from the tank 11 the auger 13 is put into operation together with the auger that is in the discharge spout 14. Thereafter, the operator moves the handle 48 so as to open the rotary valve 30 either completely or to some desired intermediate position. The grain then flows through the openings 24 and 25 into the auger housing 12 where it is readily moved by the auger 13. After the grain tank 11 has been emptied, or after the desired amount of grain has been removed or discharged from it, the operator actuates the handle 48 so as to close the rotary valve 30. This is done while the discharge auger 13 is still operating so that after the valve has been closed the grain remaining in the housing 12 will be discharged therefrom. Emptying the discharge or auger housing 12 after the rotary valve 30 is closed makes it easy to subsequently put the auger 13 into operation since it can start up under a no-load condition. On the other hand, if the discharge or auger housing 12 were filled with grain, it would be necessary to start the auger under a full load from a dead start.

What is claimed as new is:

1. In a combine grain tank having an elongated generally horizontal, discharge auger housing at the bottom of a grain discharge hopper with panels diverging upwardly from the opposing top edges of said housing and having an elongated auger shield in said hopper mounted over said discharge auger housing and the auger therein with the opposing bottom edges of said shield being spaced in parallel alignment substantially directly above and over said top edges of said housing so as to provide generally vertical elongated grain inlet openings into said housing, the improvement which comprises a rotary valve member for said grain inlet openings comprising, elongated strip members having a width and length approximately equal to the height and length of said grain inlet openings, support means for said strip members so that in the closed position of said valve member said strip members are approximately upright and substantially close off said elongated inlet openings, bearing means for said support means whereby said rotary valve member is rotatable about an axis extending between said grain inlet openings and generally parallel thereto, and means for turning said rotary valve member between its said closed position and an open position, said support means comprising a shaft mounted on said bearing means substantially directly above and parallel to said auger and said turning means comprising a crank arm secured to one end of said shaft.

* * * * *